May 18, 1926.

G. SUMMERS ET AL

TOWING LINE FOR VEHICLES

Filed July 14, 1924    2 Sheets-Sheet 1

1,585,435

Inventors
George Summers
and James F. Miner
By Vernon C. Hodges their Atty.

May 18, 1926.

G. SUMMERS ET AL

TOWING LINE FOR VEHICLES

Filed July 14, 1924  2 Sheets-Sheet 2

1,585,435

INVENTORS
George Summers
BY and James F. Miner
Vernon Hodges
their ATTORNEY

Patented May 18, 1926.

1,585,435

UNITED STATES PATENT OFFICE.

GEORGE SUMMERS AND JAMES F. MINER, OF ENDICOTT, NEW YORK.

TOWING LINE FOR VEHICLES.

Application filed July 14, 1924. Serial No. 725,966.

Our invention relates to an improvement in towing lines for vehicles.

The object of our invention is to provide a towing line of light weight and simple construction so as to permit its being carried in the tool kit of any automobile, and which may be easily and quickly attached to the towed and towing vehicles.

A further object of our invention is to construct a towing line which will normally remain in a spirally coiled form when not in use. This has the advantage of taking up the slack as well as overcoming the sudden pull when the cars are stopping or starting.

Figure 1:
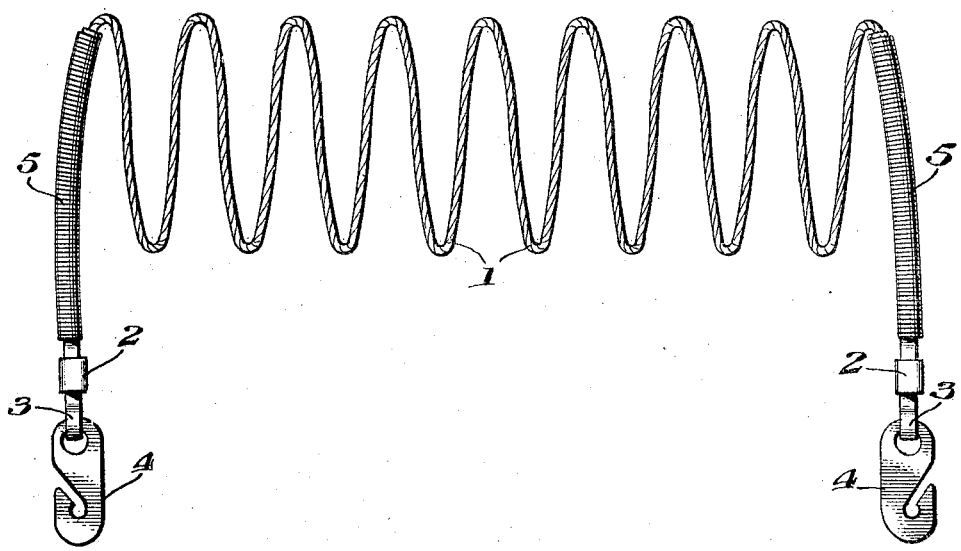
Fig. 1 is a side elevation of the towing line slightly expanded.

The major portion of the device is in the form of a wire cable 1 composed of a plurality of strands of wire twisted together to give added strength and more spring to the cable. A steel clamp 2 is secured to each end of the cable 1 and terminates in a loop 3 to which is fastened a hook 4. A spring 5 is secured to each end of the cable 1 immediately back of the clamp 2.

The cable 1 consisting of a plurality of wires is made of spring steel and is coiled into a circular form and tempered so that it will assume that form when not in use. When in use, the end of the cable is passed around the axle or spring of a vehicle and the hook 4 is passed over the cable 1, forming a loop which is drawn tight as the cable is straightened out. The spring 5 bears against the axle and prevents the axle from wearing through the cable. It also distributes and spreads the strain over an extended portion of the cable, forming a rounded tension portion thereon.

In our modified form, instead of the hook 4, a chain 6 is used having one end secured to the loop 3, and having its other end adapted to be passed around the axle and be engaged by the hook 7. Obviously, the spring 5 would be unnecessary with this form and is therefore not shown.

Figure 2:
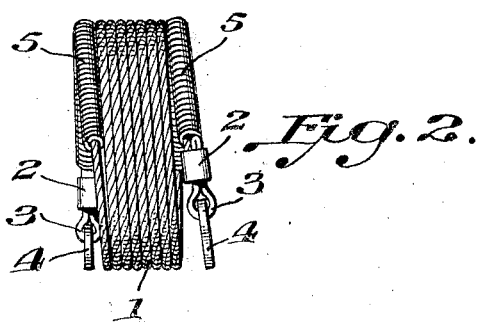
Fig. 2 is a side elevation of the towing line in its coiled position.
Figure 3:
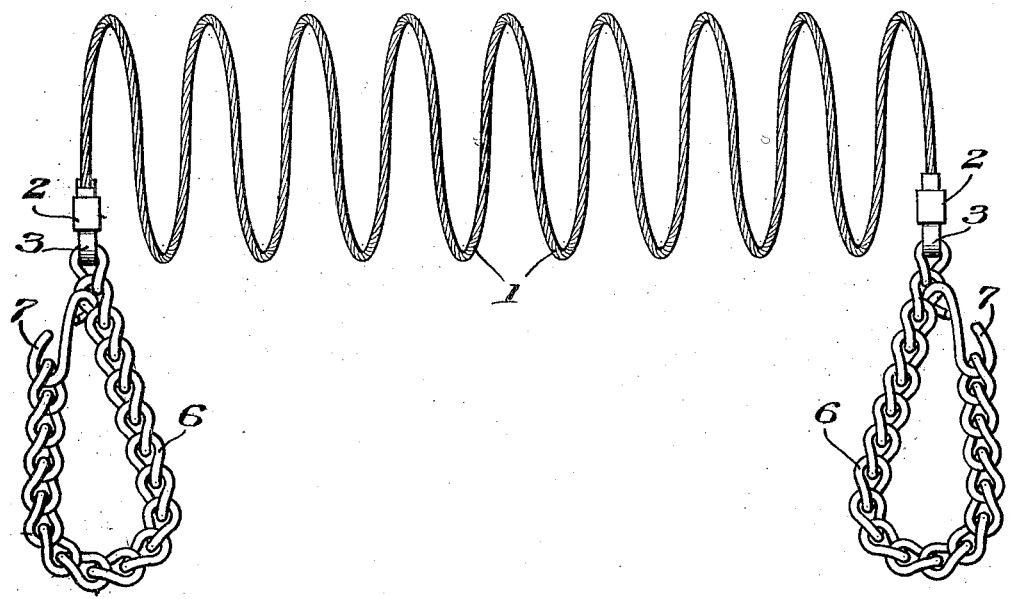
Fig. 3 is a side elevation of a modified form of towing line slightly expanded.
Figure 4:
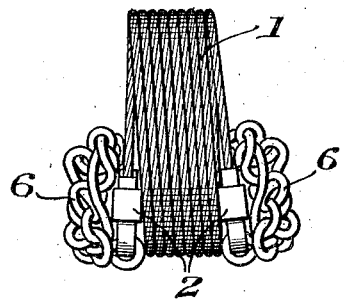
Fig. 4 is a side elevation of the modified form of towing line in its coiled position.

The spiral spring referred to in the specification and claims is one in which the coils are substantially side by side when in the coiled position, substantially as shown in Figs. 2 and 4.

We claim:

1. A towing line including a spiral spring capable of being drawn into a substantially straight line under tension which towing line inherently recoils on the removal of the tensile strain.

2. A towing line including a spiral spring extending substantially throughout the entire length thereof and capable of being drawn under tension in a substantially straight line in the general direction of the longitudinal axis of the spring, and which towing line inherently recoils on the removal of the tensile strain.

3. A towing line including a spiral spring formed of a plurality of metallic strands and capable of being drawn into a substantially straight line under tension which towing line inherently recoils on the removal of the tensile strain.

4. A towing line in the form of a spring extending substantially throughout its length and capable of being drawn into a substantially straight line under tension which towing line inherently recoils on the removal of the tensile strain, and fastening means for said towing line.

5. A towing line including a cable having fastening means secured to an end thereof, and a flexible metallic sleeve mounted on said cable adjacent the fastening means.

6. A towing line including a cable having fastening means secured to an end thereof, and a spring sleeved over and secured to said cable adjacent the fastening means.

7. A towing line including a flexible cable, a loop secured to each end thereof, a clamp securing the loop to the cable, a hook secured to said loop, and a spring surrounding and secured to the cable adjacent the clamp and loop.

8. A towing line consisting of a flexible cable which normally assumes a coiled position, a loop secured to each end of the cable, a hook secured to the loop, and a spring surrounding and secured to the ends of the cable adjacent the loop.

In testimony whereof we affix our signatures.

GEORGE SUMMERS.
JAMES F. MINER.